United States Patent [19]
Takiura et al.

[11] 3,864,069
[45] Feb. 4, 1975

[54] APPARATUS FOR CROSS-LINKING MOLDING OF HIGH POLYMERS

[75] Inventors: Mamoru Takiura, Kawasaki; Yasushi Ebisawa; Noriyuki Kikuchi, both of Tokyo, all of Japan

[73] Assignee: Ikegai Tekko Kabushiki Kaisha, Tokyo, Japan

[22] Filed: Apr. 2, 1973

[21] Appl. No.: 347,203

[30] Foreign Application Priority Data
Apr. 4, 1972 Japan.............................. 47-33660

[52] U.S. Cl.................. 425/204, 425/379, 264/40, 264/349
[51] Int. Cl............................................. B29f 3/02
[58] Field of Search ......... 425/200, 204, 243, 244, 425/245 R, 379, DIG. 228; 264/40, 329, 349

[56] References Cited
UNITED STATES PATENTS
2,359,840   10/1944   Goessling........................ 425/243 X
3,218,375   11/1965   Hardwick........................ 425/245 X FOREIGN PATENTS OR APPLICATIONS
1,438,470   4/1966   France............................... 425/244

Primary Examiner—R. Spencer Annear
Attorney, Agent, or Firm—Woodhams, Blanchard and Flynn

[57] ABSTRACT

A molding apparatus provided with an extruder, a feed plunger connected with the tip of the extruder, a reaction plunger corresponding to and connected with the feed plunger, and a diehead connected with the reaction plunger, whereby the apparatus is useful in high-pressure fluid cross-linking molding of high polymers.

7 Claims, 21 Drawing Figures

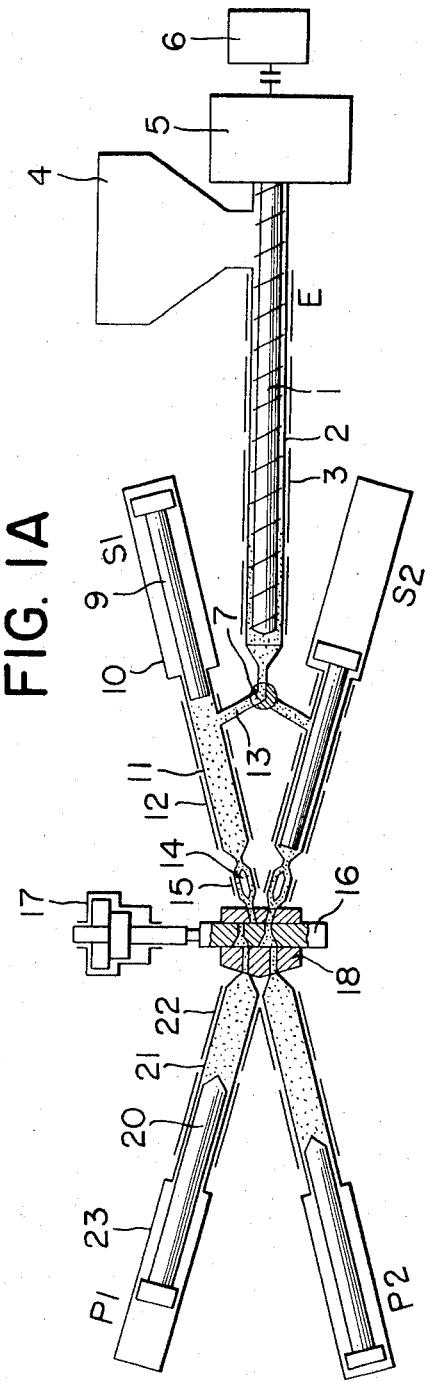
FIG. IA
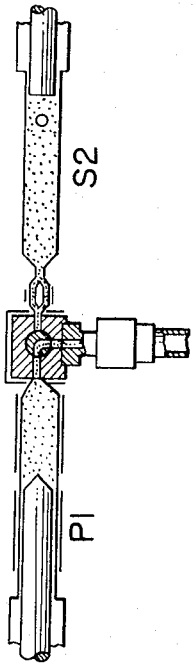
FIG. IC
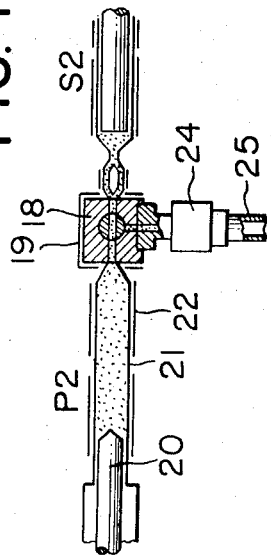
FIG. IB
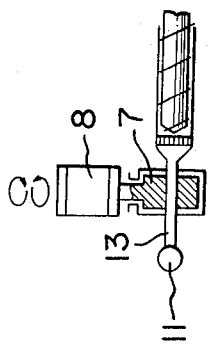
FIG. ID

APPARATUS FOR CROSS-LINKING MOLDING OF HIGH POLYMERS

BACKGROUND OF THE INVENTION a. Field of the Invention

The present invention relates to improvement of the apparatus for cross-linking molding purpose, which renders it possible to perform the operation comprising: melting and kneading a mixture composed of high polymers such as polyolefin and polyvinyl chloride, and a cross-linking agent dispersed uniformly therein by applying such temperature and pressure as will not give rise to cross-linking reaction within a screw-driven extruder; effecting the cross-linking reaction by applying a high pressure under an appropriate condition of temperature upon introducing the kneaded mixture into a reaction chamber; and subsequently extruding the cross-linked mixture continuously through a head die.

b. Description of the Prior Art

A high-pressure fluid cross-linking molding apparatus is required to be capable of: melting a mixture composed of high polymers and a cross-linking agent under such a condition of temperature and pressure as will not give rise to cross-linking reaction; heating the thus melted material up to a uniform temperature sufficient for effectively performing the cross-linking reaction under a high pressure in a short time while retaining the material in fluid state; holding the thus heated molten material under a pressure effective for uniformly performing the cross-linking reaction for a fixed period of time; and then extruding said material in defiance of the resistance of the molding head die.

SUMMARY OF THE INVENTION

The present invention is to provide an improved molding apparatus which not only sufficiently meets the foregoing requirements but also improves the efficiency and enhances the uniformity of the cross-linking reaction. The molding apparatus under the present invention is characterized by the provision of: a screw-driven extruder for the purpose of melting and kneading a mixture composed of high polymers and a cross-linking agent by applying such temperature and pressure as will not give rise to cross-linking reaction; at least two units of feed plungers having a heating member for imparting heat energy effective for a cross-linking reaction in a short time as the molten mixture is being extruded, said plungers being connected with the tip of said extruder through passages; a distributing valve for the purpose of opening and closing said passages alternately; reaction plungers corresponding to and connected with said feed plungers of the same number through passages; a molding head die connected with said reaction plungers through passages; and a transfer valve devised to open and close said passages alternately. According to this apparatus, the molten material extruded by the extruder without being cross-linked is transferred into the reaction plunger from the feed plunger under the pressure set by the reaction plunger, and, upon producing a pressure between the feed plunger and reaction plunger sufficient for effecting a cross-linking reaction, said material is held in that condition for a required period of time. Besides, at the time of transferring the molten material from the feed plunger to the reaction plunger, heat energy effective for cross-linking reaction is uniformly imparted to the molten material by means of the heating member provided on the fore end of the feed plunger. Further, the molten material which has undergone the reaction within at least two reaction plungers is extruded through the molding head die by switching the transfer valve while one reaction plunger is being decelerated and another reaction plunger is being accelerated according to a prescribed velocity program so as to regulate the quantity of the material being extruded.

BRIEF DESCRIPTION OF THE DRAWINGS

Of the appended drawings, FIG. 1A is a schematic representation of the arrangement of members of an apparatus according to the present invention, and FIGS. 1B, 1C and 1D are cross-sectional views of parts thereof.

FIGS. 2A', 2B' and 2C' are schematic representations in cross section of the transfer valve member and its coaction with the discharge orifice which communicates with the diehead, and illustrating the transfer valve in the three positions corresponding to FIGS. 2A, 2B and 2C, respectively.

DESCRIPTION OF THE PREFERRED EMBODIMENTS

Figure 3A:
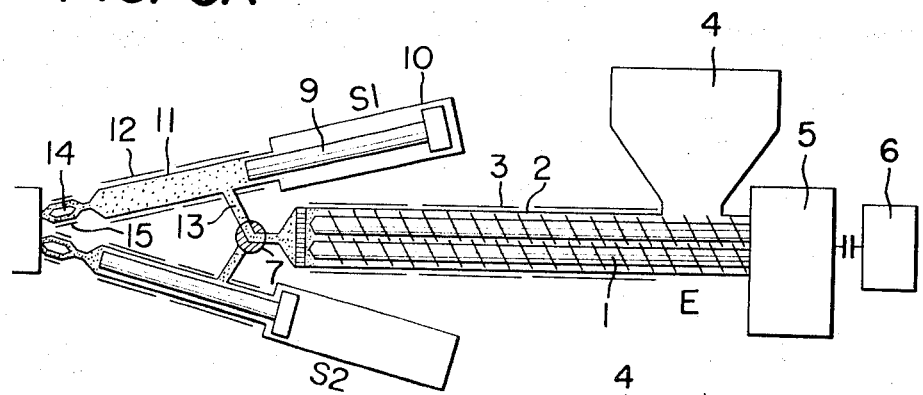
FIGS. 3A–3E are schematic representations of other various arrangements of members of an apparatus which may be utilized in practicing the present invention.
Figure 3B:
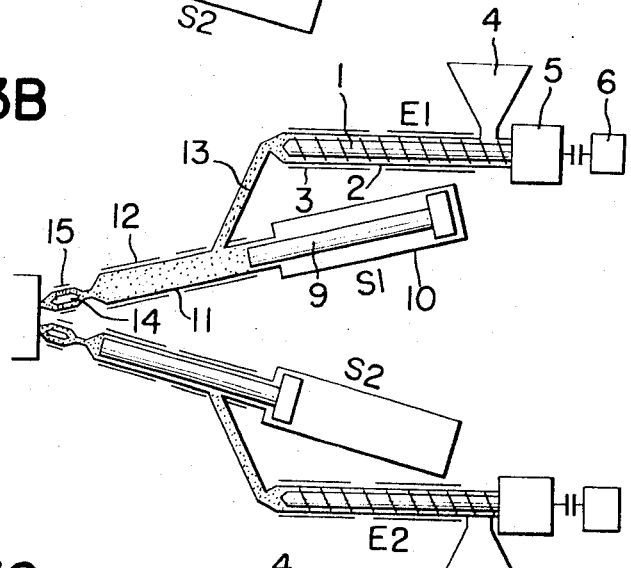
Figure 3C:
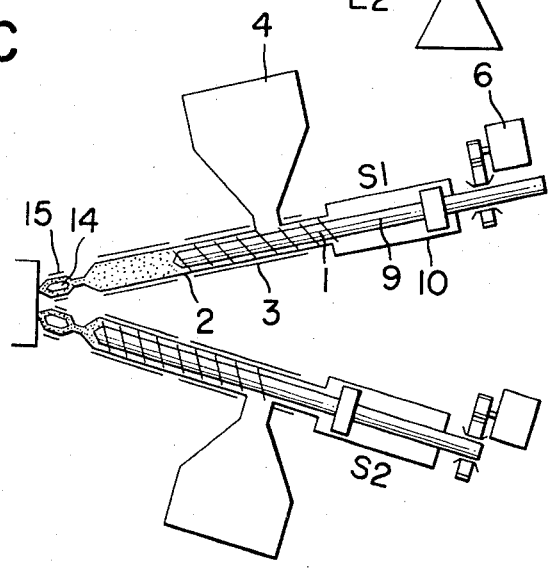
Figure 3D:
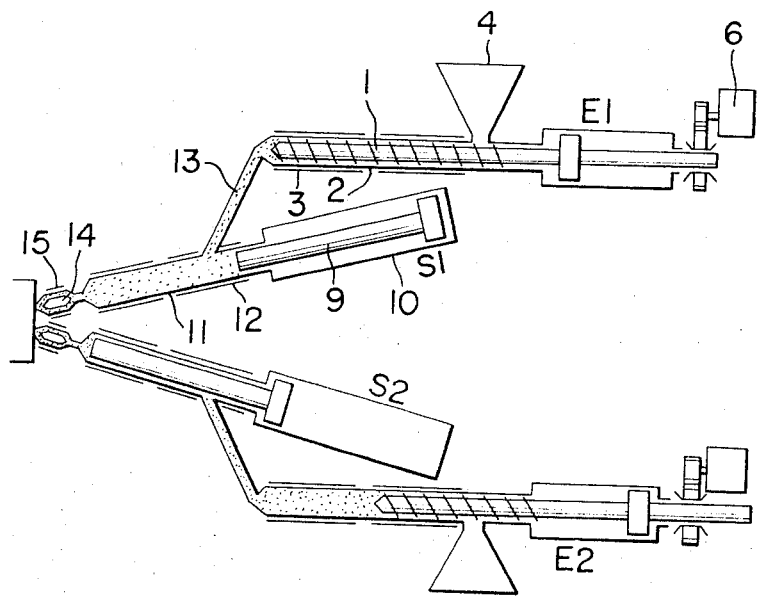
Figure 3E:
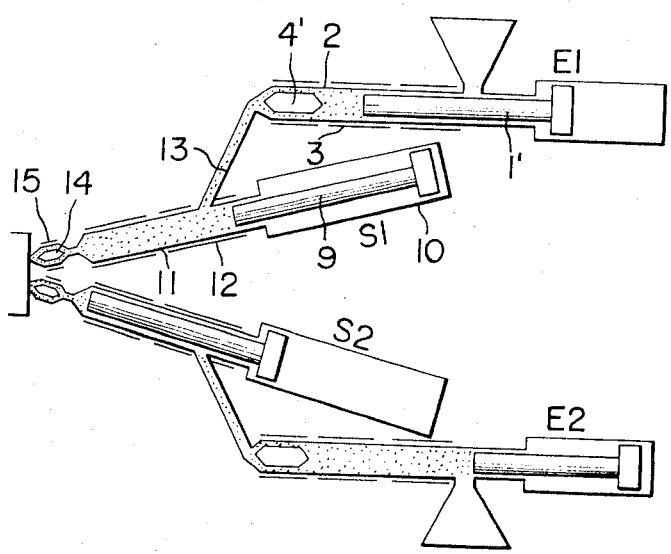
Figure 4:
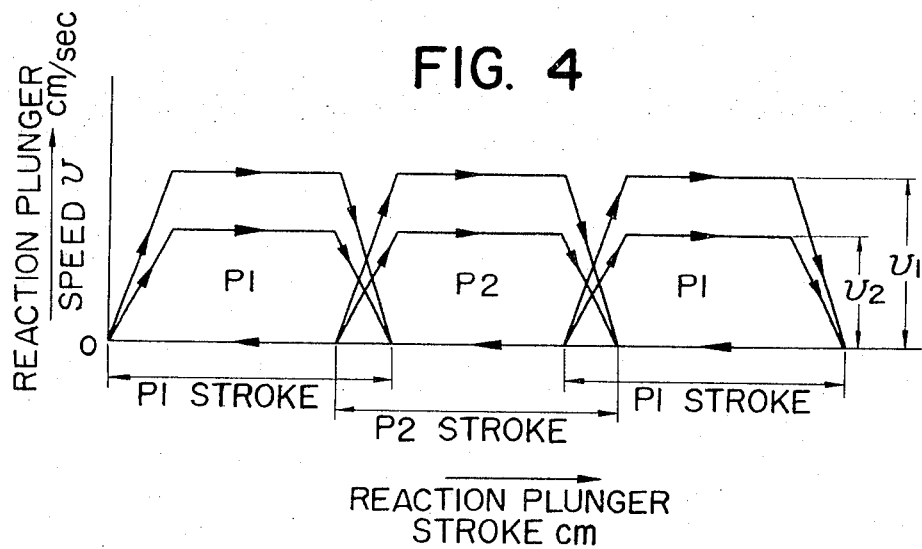
FIG. 4 is a diagrammatic representation of the relation between the stroke and velocity of the reaction plunger.
Figure 5A:
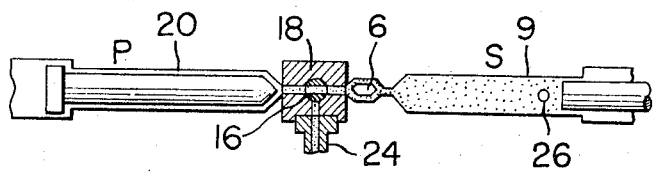
FIG. 5A–5E are schematic representation of the sequence of work of the feed plunger and reaction plunger.
Figure 5B:
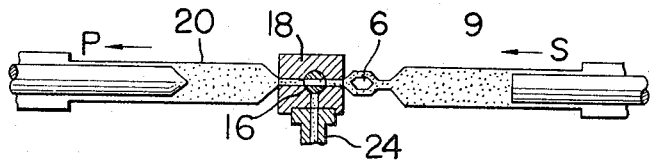
Figure 5C:
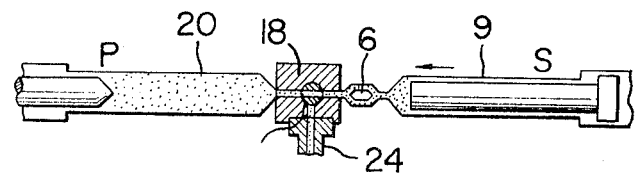
Figure 5D:
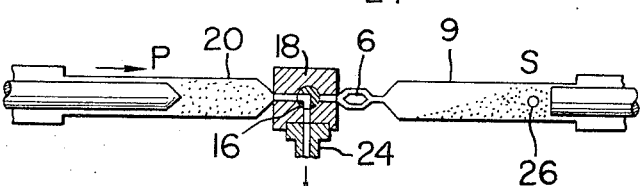
Figure 5E:
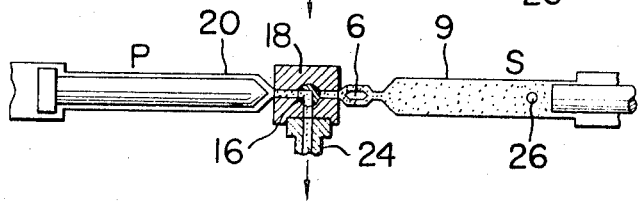

FIG. 1A shows the arrangement of members of an apparatus under the present invention, and FIGS. 1B, 1C and 1D respectively show the vertical sections of parts thereof. In FIG. 2, A, A', B, B', C and C' respectively show the transverse section and vertical section of the transfer valve member. In FIG. 3 showing various modes of application of the apparatus under the present invention, FIG. 3A is the case wherein a two-screw type extruder is employed as the screw-driven extruder; FIG. 3B is the case wherein one unit of screw-driven extruder (this may be a two-screw type extruder) is combined with each feed plunger; FIG. 3C is the case wherein a couple of screw-driven injection molding machines (these may be two-screw type injection molding machine) are employed in lieu of the feed plunger; and FIG. 3D and FIG. 3E are the cases wherein each feed plunger is respectively combined with a screw-driven injection molding machine (this may be a two-screw type injection molding machine). FIG. 4 is a diagrammatic representation of the relation between the stroke and velocity of the reaction plunger. FIGS. 5A–5E show the sequence of work of the feed plunger and reaction plunger.

In these appended drawings, the numeral reference 1 denotes the plasticizing screw of the screw-driven extruder, 2 denotes the cylinder of the extruder, 3 denotes the heater installed around said cylinder, 4 denotes the feed hopper, 5 denotes the reduction gear for use in driving the screw, 6 denotes the electric motor for use in driving the screw, 7 denotes the distributing valve for the purpose of distributing the molten material coming out of the screw-driven extruder to plural feed plungers, 8 denotes the rotary actuator for valve 7, 9 denotes the feed plunger, 10 denotes the oil-pressure cylinder for said feed plunger, 11 denotes the cylinder of the feed plunger, 12 denotes the heater installed around said cylinder, 13 denotes the passage to connect the fore end of the extruder with the feed plunger, 14 denotes the torpedo of the heating member, 15 denotes the heater of the heating member, 16 denotes the transfer valve, 17 denotes the double oil-pressure cylinder for switching said transfer valve, 18 denotes the transfer valve proper, 19 denotes the heater for the transfer valve proper, 20 denotes the reaction plunger, 21 denotes the cylinder for said reaction plunger, 22 denotes the heater, 23 denotes the oil-pressure cylinder for the reaction plunger, and 24 denotes the molding head die.

The high polymers employed are first plasticized, melted and kneaded under such a condition of temperature and high pressure as will not give rise to cross-linking reaction by the screw 1 driven by the electric motor 6. Then, the molten material is introduced into the cylinder 11 of the feed plunger 9 through the distributing valve 7. On this occasion, the capacity of the feed plunger 9 must be sufficient for permitting full utilization of the extrudability of the screw-driven extruder. The molten material within the cylinder 11 of the feed plunger 9 is extruded toward the reaction plunger 20 disposed opposite to said feed plunger 9, and, on this occasion, said molten material passes through the torpedo 14 of the heating member provided on the tip of the cylinder 11 of the feed plunger 9 to be imparted with heat energy required for effectively performing cross-linking reaction under elevated pressure subsequent thereto. Besides, the foams present in the molten material are completely removed through this process as said material moves under pressure between the reaction plunger 20 and the feed plunger 9. The pressure to be applied on this occasion is determined by the oil pressure set by the oil-pressure cylinder 21 of the reaction plunger 20.

Next, the reaction plunger 20 moves back while receiving the material having an elevated temperature until it reaches the stroke end. Even when it has reached the stroke end, however, as there still works the force to advance the feed plunger 9, the material within the cylinder 21 of the reaction plunger 20 is subjected to pressure as it is in a stationary state. The pressure to act upon the material on this occasion is to be determined by the oil pressure set by the oil-pressure cylinder 10 of the feed plunger 9, and is to be effective in giving rise to cross-linking reaction of the material. Subsequent to application of pressure onto the material for a fixed time, the transfer valve 16 is switched to connect the cylinder 21 of the reaction plunger 20 with the molding diehead 24, and the material is extruded as the product 25. As the material within the cylinder 21 of plural reaction plungers 20 is to be extruded continuously in a regular size from the molding head die 24, the reaction plungers 20 are so devised as to work in accordance with a velocity program such as shown in FIG. 4.

The sequence of work of the feed plunger 9 and reaction plunger 20 is as collectively shown in FIG. 5, wherein A represents the state of the molten material before cross-linking having been sent into the feed plunger 9 from the screw-driven extruder; B represents the state of the material being pushed into the reaction plunger 20 by the feed plunger 9 advancing in defiance of the pressure set by the reaction plunger 20; C represents the state of the material being held under a pressure required for effecting cross-linking reaction for a fixed time as a result of the reaction plunger 20 having reached the stroke end and the force to advance the feed plunger 9 having produced said pressure; D represents the state of retreat of the feed plunger 9 while the material is being extruded out of the head die 24 as a result of switchover of the transfer valve 16 and with the advance of the reaction plunger 20; and E represents the state of the molten material resin before cross-linking having been sent into the feed plunger 9 again from the screw-driven extruder. In FIG. 5, 26 denotes the inlet for receiving the material from the screw-driven extruder.

Figure 2A:
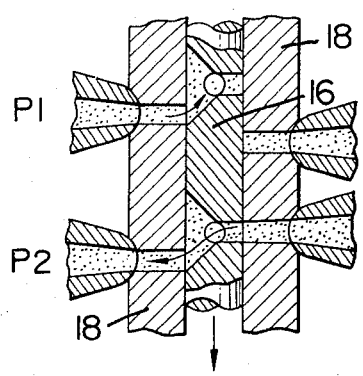
FIGS. 2A, 2B and 2C are schematic representations in cross section of the transfer valve member coacting between the feed plungers and the reaction plungers and illustrating the transfer valve in three different locations.
Figure 2A:
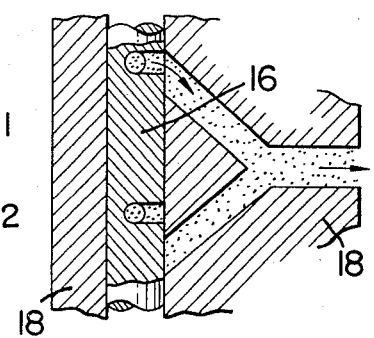
Figure 2B:
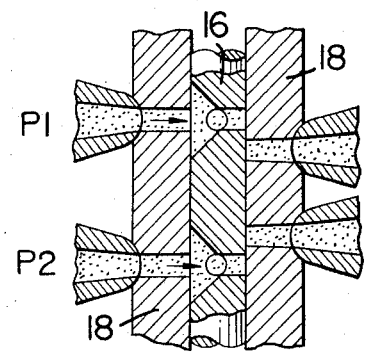
Figure 2B:
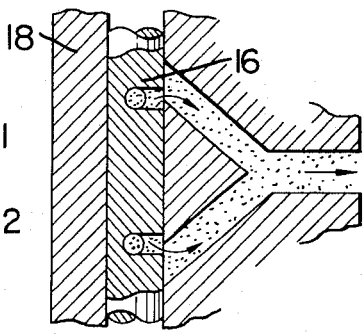
Figure 2C:
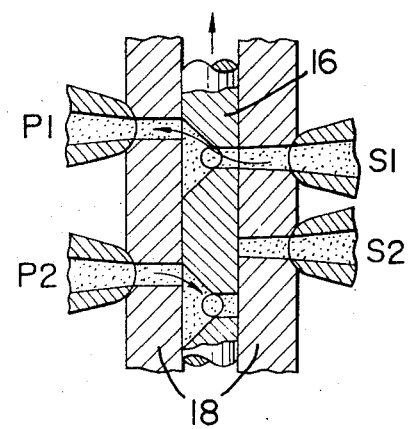
Figure 2C:
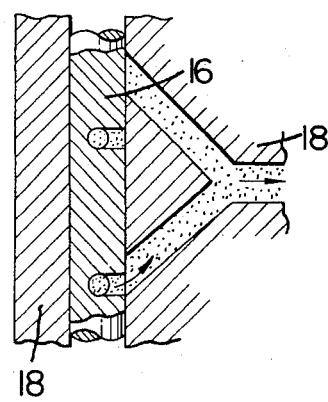

When the transfer valve 16 is in one of its extreme positions, as illustrated in FIGS. 2A and 2A', the one feed plunger S2 is in open communication with the corresponding reaction plunger P2, whereas the other reaction plunger P1 is isolated from its corresponding feed plunger S1 but is coupled to the discharge orifice which is associated with the diehead for permitting the material to be extruded through the diehead 24. On the other hand, when the transfer valve 16 is shifted into its other extreme position, as illustrated in FIGS. 2C and 2C', then the feed plunger S1 communicates with its corresponding reaction plunger P1, and the other reaction plunger P2 is now isolated from its feed plunger S2 but is instead connected to the discharge orifice to permit the material to be extruded to the diehead 24. When the transfer valve 16 is shifted between the two extreme positions illustrated in FIGS. 2A–2A' and 2C–2C', then both reaction plungers P1 and P2 are momentarily disconnected from their respective feed plungers S1 and S2 as illustrated in FIG. 2B. However, during this shifting, the reaction plungers P1 and P2 both momentarily communicate with the discharge orifice which communicates with the diehead as illustrated in FIG. 2B'. Thus, during shifting of a transfer valve 16 between its extreme positions, while both plungers S1 and S2 are momentarily disconnected, nevertheless both reaction plungers P1 and P2 are connected to the diehead so that either or both of the reaction plungers P1 and P2 are continuously connected to the discharge orifice associated with the diehead 24 at all times. This overlap of the reaction plungers P1 and P2 during shifting of the valve 16 is illustrated by the overlapping areas defined by the strokes as appearing in FIG. 4. The present invention thus results in a continuous flow of plasticized material from either or both of the reaction plungers P1 and P2 to the diehead 24.

What is claimed is:

1. A high-pressure fluid cross-linking molding apparatus for use in molding high polymers, comprising:
   extruder means for melting and kneading a mixture composed of high polymers and a cross-linking agent by applying such temperature and pressure as will not give rise to a cross-linking reaction;
   a plurality of feeding units each having a feed chamber containing a relatively movable feeding plunger therein and a heating device for imparting heat energy within said chamber effective to cause a crosslinking reaction;

passageway means providing communication between the discharge end of said extruder means and the feed chambers associated with the plurality of feeding units;

a plurality of reaction units each having a reaction compartment and a relatively movable reaction plunger therein, each of said reaction units being associated with a corresponding one of said feeding units;

a plurality of first passages connecting and providing communication between each of said feed chambers and a corresponding reaction compartment;

a molding head assembly and a plurality of second passages connected to and providing communication between said reaction compartments and said molding head assembly; and transfer valve means associated with said first and second passages for alternately opening and closing said first and second passages to provide for the continuous flow from said reaction compartments to said molding head assembly while permitting intermittent and alternating flow from each of said feed chambers to a corresponding reaction compartment.

2. An apparatus according to claim 1, wherein said transfer valve means includes a shiftable valve member movable between first and second positions, said valve member when in said first position providing communication between one of said feed chambers and one of said reaction compartments while isolating the other feed chamber from the other reaction compartment, said other reaction compartment being connected in communication with said molding head assembly when said valve member is in said first position;

said valve member when in said second position providing direct communication between said other feed chamber and said other reaction compartment while isolating said one feed chamber from said one reaction compartment, said one reaction compartment being in communication with said molding head assembly when said valve member is in said second position.

3. An apparatus according to claim 2, wherein said valve member when being shifted between said first and second positions totally disconnects all of said feed chambers from the corresponding reaction compartments, said valve member when being shifted between said first and second positions, at least when in an intermediate location disposed between said first and second positions resulting in all of said reaction compartments being in communication with said molding head assembly.

4. An apparatus according to claim 1, further including distributor valve means associated with said passageway means for permitting the mixture as discharged from said extruder means to be alternately supplied to said feed chambers.

5. An apparatus according to claim 1, wherein said extruder means comprises a single extruder having two rotatable plasticizing screws associated therewith.

6. An apparatus according to claim 1, wherein said extruder means includes at least two screw-type extruders each being associated with one of said feeding units.

7. An apparatus according to claim 1, wherein said extruder means comprises a pair of screw-driven injection devices each having a rotatable plasticizer, and wherein each of said feeding plungers is combined with one of said plasticizers.

* * * * *